(12) United States Patent
Yasuraoka et al.

(10) Patent No.: US 10,805,710 B2
(45) Date of Patent: Oct. 13, 2020

(54) ACOUSTIC DEVICE AND ACOUSTIC PROCESSING METHOD

(71) Applicants: Yamaha Corporation, Hamamatsu-shi, Shizuoka (JP); Fujitsu Limited, Kawasaki-shi, Kanagawa (JP)

(72) Inventors: Naoki Yasuraoka, Hamamatsu (JP); Yukio Tada, Iwata (JP); Jun Inoue, Komae (JP); Jun Usui, London (GB); Mitsuki Arita, Hamamatsu (JP); Nariyasu Hayakawa, Yokohama (JP); Miho Kyoya, Kawasaki (JP); Kazuki Takano, Hitachiota (JP); Yasuhiko Asahi, Iwata (JP)

(73) Assignees: Yamaha Corporation, Hamamatsu-shi (JP); Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 16/432,208

(22) Filed: Jun. 5, 2019

(65) Prior Publication Data

US 2019/0289385 A1 Sep. 19, 2019

Related U.S. Application Data

(63) Continuation of application No. PCT/JP2017/043882, filed on Dec. 6, 2017.

(30) Foreign Application Priority Data

Dec. 6, 2016 (JP) ................................. 2016-236778

(51) Int. Cl.
*H04R 1/10* (2006.01)
*G10L 17/00* (2013.01)
(Continued)

(52) U.S. Cl.
CPC .......... *H04R 1/1041* (2013.01); *G10L 17/005* (2013.01); *H04R 1/10* (2013.01);
(Continued)

(58) Field of Classification Search
CPC ............... H04R 1/1083; G10K 11/178; G10K 2210/3028; G10K 11/175
(Continued)

(56) References Cited

U.S. PATENT DOCUMENTS 5,867,581 A 2/1999 Obara
6,563,931 B1 5/2003 Soli et al.
(Continued)

FOREIGN PATENT DOCUMENTS

JP 6-189396 A 7/1994
JP 8-22291 A 1/1996
(Continued)

OTHER PUBLICATIONS

International Search Report (PCT/ISA/210) issued in PCT Application No. PCT/JP2017/043882 dated Mar. 6, 2018 with English translation (four (4) pages).
(Continued)

*Primary Examiner* — Alexander Krzystan
(74) *Attorney, Agent, or Firm* — Crowell & Moring LLP (57) ABSTRACT

An acoustic device includes a member which divides an ear canal of a user and an external space when being attached to an ear or the ear canal of the user, a memory that stores instructions, and a processor that executes the instructions. The instructions cause the processor to perform, acquiring a sound signal indicating a sound, applying a filter processing to the acquired sound signal, the filter processing being changed in accordance with a predetermined condition, and radiating the sound indicated by the sound signal applied with the filter processing to the ear canal.

17 Claims, 2 Drawing Sheets

(51) Int. Cl.
  *H04R 3/04* (2006.01)
  *H04R 25/00* (2006.01)
  *H04R 3/00* (2006.01)
  *G10L 25/51* (2013.01)
(52) U.S. Cl.
  CPC ......... *H04R 1/1016* (2013.01); *H04R 1/1091* (2013.01); *H04R 3/00* (2013.01); *H04R 3/04* (2013.01); *H04R 25/00* (2013.01); *G10L 17/00* (2013.01); *G10L 25/51* (2013.01); *H04R 2420/07* (2013.01)
(58) Field of Classification Search
  USPC .............................. 381/71.11, 74, 71.6, 71.8
  See application file for complete search history.

(56) References Cited

U.S. PATENT DOCUMENTS

| | | | | |
|---|---|---|---|---|
| 2015/0222977 | A1* | 8/2015 | Angel, Jr. | H04R 1/105 381/74 |
| 2015/0243296 | A1* | 8/2015 | Purpura | G10L 21/02 381/74 |
| 2015/0281853 | A1* | 10/2015 | Eisner | H04R 25/505 381/312 |
| 2016/0057526 | A1* | 2/2016 | Jaffe | H04R 1/1083 381/74 |

FOREIGN PATENT DOCUMENTS

| | | |
|---|---|---|
| JP | 8-294197 A | 11/1996 |
| JP | 2011-188334 A | 9/2011 |
| JP | 2011-199697 A | 10/2011 |
| JP | 2015-130659 A | 7/2015 |
| WO | WO 2014/034086 A1 | 3/2014 |
| WO | WO 2015/103578 A1 | 7/2015 |

OTHER PUBLICATIONS

Japanese-language Written Opinion (PCT/ISA/237) issued in PCT Application No. PCT/JP2017/043882 dated Mar. 6, 2018 (six (6) pages).

Kameoka et al., "Harmonic Temporal Structured Clustering: A New Approach to CASA", pp. 1-6, with English abstract, (six (6) pages).

Japanese-language Office Action issued in counterpart Japanese Application No. 2018-555048 dated Jan. 7, 2020 with English translation (16 pages).

Japanese-language Office Action issued in Japanese Application No. 2018-555048 dated Jun. 23, 2020 with English translation (13 pages).

* cited by examiner

ACOUSTIC DEVICE AND ACOUSTIC PROCESSING METHOD

CROSS REFERENCE TO RELATED APPLICATIONS

This application is a continuation of PCT application No. PCT/JP2017/043882, which was filed on Dec. 6, 2017 based on Japanese Patent Application (No. 2016-236778) filed on Dec. 6, 2016, the contents of which are incorporated herein by reference.

BACKGROUND OF THE INVENTION

1. Field of the Invention

The present invention relates to an acoustic device attached to an ear of a user and an acoustic processing method in the acoustic device, and particularly to an acoustic device and an acoustic processing method having a function of selecting a sound to be heard by the user.

2. Description of the Related Art

A technical field called Computational Auditory Scene Analysis (CASA) is known for realizing a human auditory function with a computer (for example, Non-Patent Literature 1). In this technical field, attention is paid to the realization of mixed sound separation algorithms.

Non-Patent Literature 1: Hirokazu Kameoka, Jonathan Le Roux, Nobutaka Ono, Shigeki Sagayama, "Harmonic Temporal Structured Clustering: A New Approach to CASA", [online], [Oct. 27, 2016 search], Internet <URL: http://hil.t.u-tokyo.ac.jp/~kameoka/paper/Kameoka2006H10.pdf>.

There are some sounds that a person usually hears, some of which the person wants to hear, and some of which the person does not want to hear. The former sound is, for example, a sound necessary for daily life, such as voice of a conversation, or a pleasant sound such as a sound of a wild bird. The latter sound is, for example, a sound that is unpleasant for the person, such as a sound of a nearby construction or a heavy bass such as an engine sound of an automobile that frequently passes. Further, even for the same sound, there may be both a situation in which a person wants to hear positively and a situation in which a person does not want to hear positively.

SUMMARY OF THE INVENTION

The present invention has been made under the background described above and is an acoustic device attached to an ear of a user and an acoustic processing method in the acoustic device, and an object thereof is to provide an acoustic device and an acoustic processing method capable of changing external sound to be heard by the user.

In order to solve the problem described above, the acoustic device of the present invention provides an acoustic device including a member which divides an ear canal of a user and an external space when being attached to an ear or the ear canal of the user; an acquisition section which acquires a sound signal indicating a sound; a sound processing section which applies filter processing to the sound signal acquired by the acquisition section, the sound processing section changing the filter processing in accordance with a predetermined condition; and a sound emitting section which radiates the sound indicated by the sound signal applied with the filter processing to the ear canal.

The present invention provides an acoustic processing method including an acquisition step of acquiring a sound signal indicating a sound; a filter processing step of applying filter processing to the sound signal acquired in the acquiring step; a sound processing step of changing the filter processing in the filter processing step in accordance with a predetermined condition; and a sound emitting step of radiating the sound indicated by the sound signal applied with the filter processing to an ear canal.

According to the present invention, there is provided the acoustic device attached to the ear of the user and the acoustic processing method in the acoustic device, and the acoustic device and the acoustic processing method capable of changing the external sound to be heard by the user can be provided.

DETAILED DESCRIPTION OF THE EXEMPLARY EMBODIMENTS

Embodiment

Hereinafter, embodiments of the present invention will be described with reference to the drawings.

Figure 1:
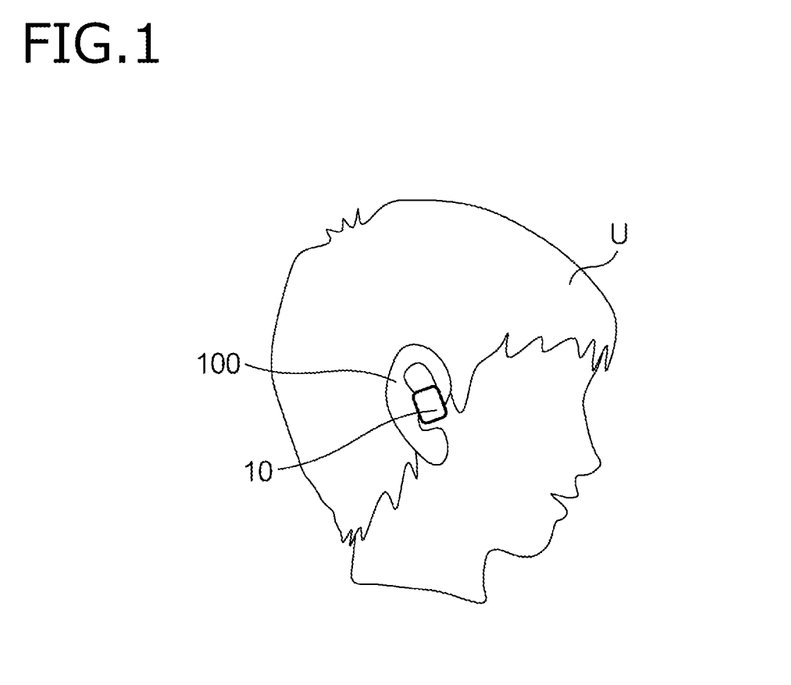
FIG. 1 is a diagram illustrating a user attaching an acoustic device according to an embodiment of the present invention.
Figure 2:
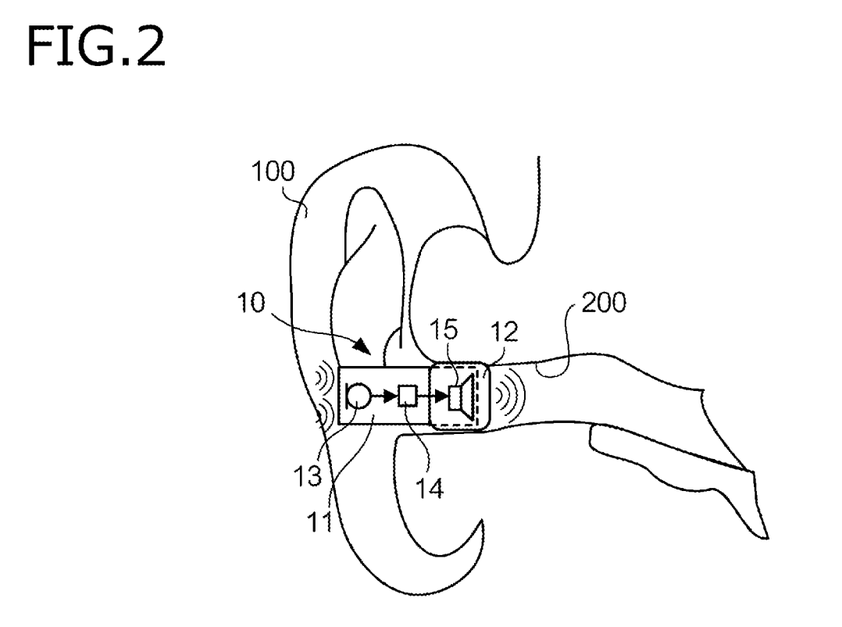
FIG. 2 is an enlarged view of the periphery of an ear of the user attaching the acoustic device according to the embodiment.

FIG. 1 is a diagram illustrating a user U attaching an acoustic device 10 according to an embodiment of the present invention. FIG. 2 is an enlarged view of the periphery of an ear 100 of the user U attaching the acoustic device 10. FIGS. 1 and 2 show a state in which the acoustic device 10 is attached to a right ear of the user U, but the acoustic device 10 is also attached to a left ear. In the drawings, dimensions of respective elements are different from actual dimensions in order to make the configuration of the present embodiment easy to understand.

The appearance of the acoustic device 10 is the same as that of a canal type earphone. That is, the acoustic device 10 is used in a state of being attached to an ear canal 200 of the ear 100. The acoustic device 10 has a structure in which it is difficult for an external sound to transmit through the ear canal 200. The acoustic device 10 is small and lightweight. Therefore, the user U can move in a state in which the acoustic device 10 is used.

The acoustic device 10 includes a housing 11, an earpiece 12, a detection section (detector) 13, a signal processing section 14, and a sound emitting section 15. The housing 11 is a cylindrical member. A detection section 13, a signal processing section 14, and a sound emitting section 15 are housed in the housing 11. The housing 11 is a member that divides the ear canal 200 from an external space when being attached to the ear canal 200. The earpiece 12 is a cylindrical member. The earpiece 12 is one end of the housing 11 and is attached to an end portion on a side of the ear canal 200. It is desirable that the material of the earpiece 12 is a material having a high degree of adhesion to a wall portion of the ear canal 200. The reason thereof is to make it difficult for the external sound to transmit through the ear canal 200. Such a material may be, for example, polyurethane or plastic, but may be a material other than these.

The detection section 13 detects the external sound. The detection section 13 converts the detected sound into a sound signal and supplies the sound signal to the signal processing section 14. Here, the detection section 13 is a microphone. The sound signal is an analog electric signal. The detection section 13 is one end of the housing 11, and is arranged in the vicinity of an end portion opposite to the end portion where the earpiece 12 is disposed.

The housing 11 may not include the detection section 13. A communication section (communicator) 141 of the signal processing section 14 of the housing 11 receives a sound signal transmitted from outside. For example, a sound detected by the microphone of a communication terminal device (for example, a smartphone) held by a user is received by the communication section 141 of the housing 11 by wireless communication. Further, for example, a sound at a remote place is detected by a microphone of a robot arranged at a remote location, and the communication section 141 of the housing 11 receives a sound signal indicating the sound around the robot at the remote place by wireless communication. In these cases, the communication section 141 also functions as an acquisition section that acquires the sound signal.

The signal processing section 14 performs predetermined signal processing on the sound signal supplied from the detection section 13 and supplies the signal to the sound emitting section 15. The signal processing includes filter processing that allows a part of the sound detected by the detection section 13 to pass and does not allow the remaining sound to pass. The filter processing will be described in detail later. The signal processing section 14 includes, for example, a hardware circuit exemplified by a Central Processing Unit (CPU), an Application Specific Integrated Circuit (ASIC), or a Digital Signal Processor (DSP), a memory exemplified by a Random Access Memory (RAM) or a Read Only Memory (ROM), a radio communication section including a radio communication circuit and an antenna, and the like. The wireless communication standard is, for example, Bluetooth (registered trademark) or Wi-Fi (registered trademark), but may be any other standards.

The sound emitting section 15 emits the sound indicated by the sound signal processed by the signal processing section 14 to the ear canal 200. Here, the sound emitting section 15 is a speaker. The sound emitting section 15 is one end of the housing 11, and is also arranged in the vicinity of the end portion where the earpiece 12 is arranged.

With the function of the acoustic device 10, the user U listens to the sound selected by the acoustic device 10 among the external sound. For this purpose, the signal processing section 14 performs signal processing such that a sound to be heard by the user U is allowed to pass, and other sounds are not allowed to pass.

Figure 3:
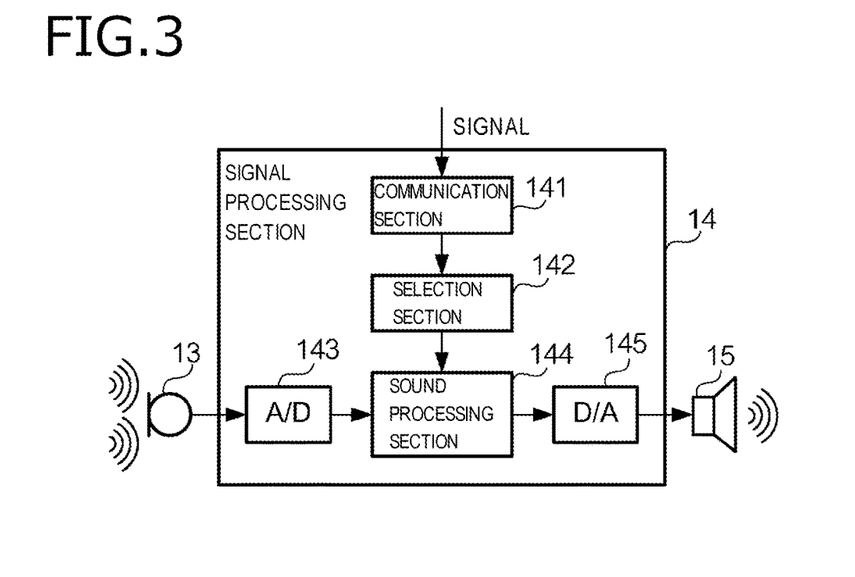
FIG. 3 is a block diagram showing an electrical configuration of a signal processing section according to the embodiment.

FIG. 3 is a block diagram showing an electrical configuration of the signal processing section 14. As shown in FIG. 3, the signal processing section 14 includes a communication section 141, a selection section (selector) 142, an A/D converter 143, a sound processing section 144, and a D/A converter 145.

The communication section 141 performs wireless communication with an external device. The communication section 141 performs the wireless communication that acquires at least a signal for selecting a sound to be passed or a sound not to be passed through the filter processing performed by the sound processing section 144.

The selection section 142 selects a sound to be passed or not to be passed through the filter processing. The sound to be passed through the filter processing is, for example, a sound necessary for daily life, such as voice of a conversation, or a comfortable sound such as a sound of a wild bird. The sound not to be passed through the filter processing is, for example, an unpleasant sound for the person, such as a sound of construction work being performed nearby, or a deep bass such as an engine sound of an automobile that frequently passes. For example, the selection section 142 selects a low-pitched sound as a sound not to be passed, and a higher-pitched sound higher than the low-pitched sound as a sound to be passed.

The selection section 142 selects a sound selected in advance by the user U (that is, a preset sound) as a sound to be passed or a sound not to be passed through the filter processing. For example, the user U performs an operation of selecting such a sound by using a communication terminal device (for example, a smartphone) in which a predetermined application program is installed. In accordance with this operation, the communication terminal device transmits a signal notifying a content selected by the user U to the signal processing section 14 through wireless communication. The selection section 142 acquires (receives) the signal from the communication terminal device by using the communication section 141.

The selection section 142 sets a filter condition (for example, a filter coefficient) of the sound processing section 144 in accordance with the selected sound to be passed or the sound not to be passed. The selection section 142 sets the filter condition such that the level of a predetermined frequency band (for example, a frequency band with the highest level) is low for the sound not to be passed through the filter processing. Besides, the selection section 142 may set the filter condition so as to reduce a level (for example, −20 dB) of the entire predetermined frequency band such as an audible range (for example, 200 Hz to 2 kHz) and a voice (200 Hz to 4 kHz) band by a predetermined amount. Further, the selection section 142 may not only set the filter condition such that the level of the predetermined frequency band is low for the sound not to be passed, but also set the sound processing section 144 so as to output an "alternative sound". In this case, when a sound in the predetermined frequency band is detected by the detection section 13, the sound processing section 144 reproduces a predetermined alternative sound pleasant for the user U at a same timing. By reproducing the alternative sound, there is also an effect of masking the sound not to be passed (that is, the sound that is low in level in the filter processing and is difficult to hear) and further making the user U less likely to hear the sound. As described above, the sound processing performed by the sound processing section 144 may include a process for outputting a predetermined sound in addition to the filter processing. The selection section 142 may set the filter condition so as to increase the level (for example, +20 dB) of the entire predetermined frequency band by a predetermined amount, and may increase the specific sound that the user U wants to hear.

Further, the selection section 142 may set the filter condition for the sound to be passed by the filter processing such that the sound processing section 144 processes the sound signal. For example, the sound processing section 144 may slightly emphasize the sound in the high frequency band, process the sound into a comfortable sound, or may process the sound into a pleasant sound by applying a reverb. When the selection section 142 selects the sound to be passed, such a processing method may be set together.

The A/D converter 143 converts the sound signal supplied from the detection section 13 from an analog format to a digital format, and supplies the sound signal to the sound processing section 144.

The sound processing section 144 applies sound processing including filter processing to at least the sound signal supplied from the A/D converter 143. The sound processing section 144 changes the filter processing applied to the sound signal by following the setting of the filter condition of the selection section 142. The sound processing section 144 includes, for example, a digital filter such as an FIR filter. The sound processing section 144 performs filter processing on the sound signal such that at least the sound selected to be passed by the selection section 142 is allowed to pass and the other sounds are not allowed to pass.

The D/A converter 145 converts the sound signal from the digital format to the analog format, and supplies the sound to the sound emitting section 15. The sound emitting section 15 emits the sound indicated by the supplied sound signal to the ear canal 200. The user U can hear the sound.

Incidentally, the selection section 142 may select the sound to be passed through the filter processing or the sound not to be passed by a method other than the preset method. For example, based on a signal input by the user U when a specific sound is allowed to pass, the selection section 142 determines whether or not to select the specific sound as a sound to be passed or a sound not to be passed through the filter processing. Such a signal includes a signal corresponding to the operation of the user U. For example, when the user U hears a certain sound and feels that the sound is unpleasant, after the certain sound is heard, an operation to instruct that the user U does not want to hear the sound is performed by using the communication terminal device. The communication terminal device notifies the signal processing section 14 that the operation is performed, together with the time when the operation is performed. When the signal indicating the notification is acquired using the communication section 141, the selection section 142 prevents the specific sound passed immediately before that from passing. The selection section 142, for example, selects, as a sound not to be passed, a sound of which the level of the predetermined frequency band is equal to or greater than a predetermined value among the sounds detected from the operation time up to a predetermined time. The speaker recognition technology registers feature information extracted from the feature of voice of a speaker, and the selection section 142 may select voice of the speaker matching the feature information as the sound not to be passed through the filter processing. Accordingly, only the voice of a specific speaker can be erased. The feature information may be stored in advance in a storage section (not shown), and the feature information may be registered by extracting features of the voice of the speaker. In the acoustic device 10, when a name of the speaker, the feather information of the speaker, and a setting (filter processing) of a filter related to the feather information are made to correspond to each other and registered, the sound processing section 144 may reproduce a synthetic voice such as "Mr. xx was talking" as "alternative sound" while masking the voice of the speaker (for example, Mr. xx) as a sound not to be passed.

The signal input from the user U may be a signal (that is, a biological signal) detected from a living body of the user U. As an example of the biological signal, there is a signal corresponding to brain waves of the user U. Whether a person who heard the specific sound felt pleasant or unpleasant can be estimated based on changes in the brain waves. Therefore, a device (not shown) that measures brain waves sequentially measures the brain waves of the user U. When brain waves indicating that the person feels pleasant or unpleasant are detected, the selection section 142 receives a signal indicating the fact. This signal may be transmitted from a device that measures brain waves to the signal processing section 14, and may be transmitted from the communication terminal device of the user U. The acoustic device 10 may have a function of measuring brain waves. Then, based on the acquired signal, the selection section 142 allows the specific sound passed when the brain wave indicating that the user U feels pleasant is measured to pass thereafter, and prevents the specific sound passed when brain waves indicating that the user U feels unpleasant are measured from passing thereafter. Other examples of detecting not only the brain waves but also the biological signal include a signal indicating a heart rate, body temperature, and blood pressure of the user U. The housing 11 may include a biological signal detection section that outputs a signal indicating that the user U feels unpleasant when at least one of the heart rate, body temperature, and blood pressure of the user U changes by a predetermined threshold or more than a normal value (mainly when at least one of the heart rate, body temperature, and blood pressure is higher than the normal value by the predetermined threshold or more). The selection section 142 receives the signal indicating that the user feels unpleasant. The biological signal detection section may be provided in a communication terminal device separate from the housing 11 connected by wireless communication.

Figure 4:
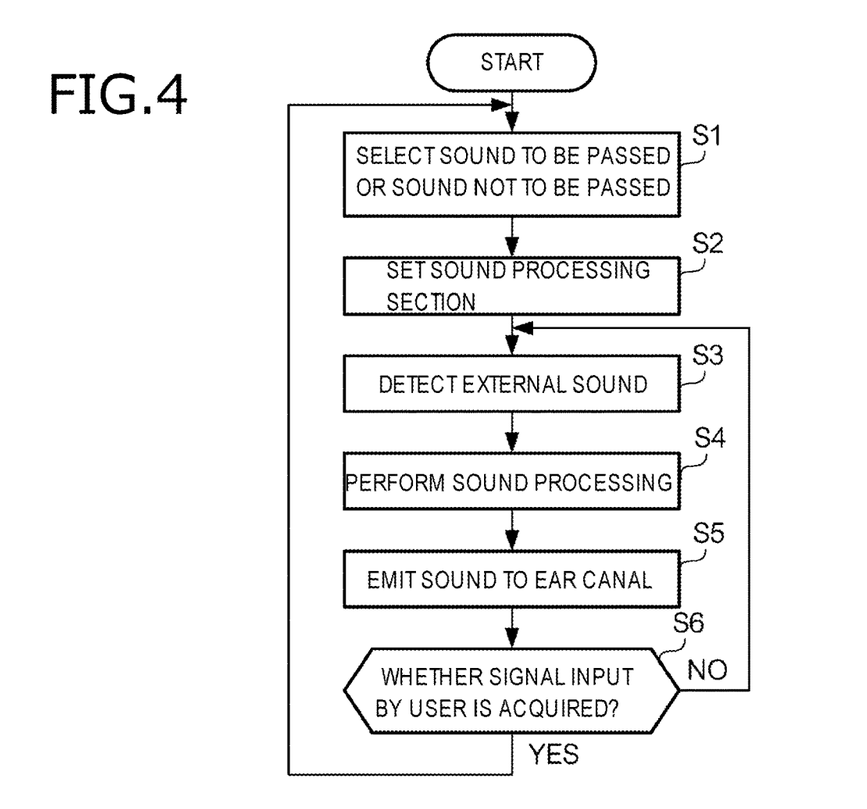
FIG. 4 is a flowchart illustrating an example of processing executed by the acoustic device according to the embodiment.

FIG. 4 is a flowchart illustrating an example of processing executed by the acoustic device 10.

The selection section 142 selects the sound to be passed or the sound not to be passed through the filter processing (step S1). Here, the selection section 142 performs selection according to the preset performed by the user U based on the signal acquired via the communication section 141. The selection section 142 sets the sound processing section 144 based on the selected result in step S1 (step S2). This setting includes at least the setting of the filter condition. When the setting is performed, the detection section 13 detects the external sound (step S3). The sound processing section 144 performs sound processing including filter processing on the sound signal supplied from the detection section 13 according to the setting of step S2 (step S4). Further, the sound emitting section 15 radiates (that is, emits) the sound signal after the sound processing supplied from the sound processing section 144, that is, the sound indicated by the sound signal after at least the filter processing is applied, to the ear canal 200 (step S5). Next, the selection section 142 determines whether or not a signal for selecting a sound to be passed or a sound not to be passed through the filter processing is acquired by using the communication section 141 (step S6). Such a signal is a signal for selecting the sound to be passed or not to be passed through the filter processing by a method other than the preset. If "NO" is determined in step S6, the processing of the acoustic device 10 is returned to step S3. If "YES" is determined in step S6, the processing of the acoustic device 10 is returned to step S1, and the sound to be passed or the sound not to be passed through the filter processing is selected.

According to the acoustic device 10 of the embodiment described above, among the detected external sounds, a sound to be heard by the user U can be selected and heard by the user U. Further, the acoustic device 10 has a function of learning a sound that the user U wants to hear or a sound that the user U does not want to hear. Accordingly, the acoustic device 10 can make the user U selectively hear the external sound based on the filter processing suitable for the sound that the user U wants to hear or the sound that the user U does not want to hear.

MODIFICATIONS

The present invention can be implemented in a form different from the above-described embodiment. The present invention, for example, may also be implemented in the following forms. Further, the following modifications may be appropriately combined with each other.

Modification 1

The selection section 142 may change the filter processing applied to the sound signal according to conditions described in the following (1) to (3).

(1) Position (Location) of Acoustic Device 10

The sound processing section 144 changes the filter processing according to the position of the acoustic device 10. For example, for safety reasons, it is considered desirable that the user U can hear an engine sound of a vehicle such as an automobile or a notification sound (siren) emitted by an emergency vehicle such as an ambulance. On the other hand, when the user U is indoors, it is considered that interference due to the inability to hear such sounds is relatively less than interference when the user U is outdoors. Further, when the user U is outdoors, there is a case where the user U does not have to hear the voice of the conversation of the person unrelated to the user U, but may want to reliably hear voice of a person talking to the user U indoors.

Therefore, the selection section 142 specifies the position of the acoustic device 10, and sets the filter condition so as to allow sound to pass or not pass according to the specified position. For the position of the acoustic device 10, for example, a method of obtaining the position by a Global Positioning System (GPS) method may be considered, but another method may be used.

(2) Time

The sound processing section 144 changes the filter processing according to the time. For example, the user U is unlikely to see the periphery in the outdoors at night. Therefore, for safety reasons, it is considered that it is desirable that the user U can hear an engine sound of a vehicle such as an automobile or a notification sound emitted by an emergency vehicle such as an ambulance. On the other hand, at a time such as morning or daytime, since the user U is likely to see the periphery, it is considered that the interference due to the inability to hear these sounds is relatively small. Further, it is desirable that the user U can hear the voice of the conversation when being awake, but it may be desirable that the user U cannot hear the voice when being sleeping, such as at midnight. Therefore, the selection section 142 specifies the time, and sets the filter condition so as to allow the sound corresponding to the specified time to pass or not pass. The time may be specified using, for example, a timing function of the acoustic device 10.

(3) User

The sound processing section 144 changes the filter processing in accordance with the user of the acoustic device 10. Even with the same sound, some users may feel that the sound is pleasant, but some users may feel that the sound is unpleasant. Moreover, it is considered that the acoustic device 10 is shared by a plurality of persons. Therefore, the selection section 142 specifies the user of the acoustic device 10, and sets the filter condition so as to allow the specified user to allow the sound to pass or not pass. Regarding the specification of the user, for example, a login operation at the start of use of the acoustic device 10 or a method using an ear acoustic authentication technique may be used, but other methods may be used. Attribute information on the age, sex, and preference of the user U is provided, the selection section 142 may set the filter condition in accordance with the provided attribute information.

(4) Arrival Direction of Sound

The sound processing section 144 changes the filter processing according to a direction of the housing 11 of the acoustic device 10 and an arrival direction of a sound from the outside. For example, when the user U is walking along a right side of the road along the road, the sound of a vehicle from a left direction (road side) of the user U may be set to pass in the filter processing. The direction of the housing 11 can be detected by a gyro sensor, the arrival direction of the sound from the outside can be detected by a directional microphone or a plurality of microphones, and geographical information such as an arrangement of the road can be detected by using a Global Positioning System (GPS).

The condition for changing the filter processing applied to the sound signal described above is merely an example. Therefore, the acoustic device 10 may change the sound to be heard by the user U by changing the filter processing according to yet another condition.

Second Modification

The material, shape, arrangement position, and the like of each component of the acoustic device 10 described in the above embodiment are merely examples, various modifications are possible.

Some of the configurations included in the above-described acoustic device 10 may be omitted or changed. For example, the acoustic device 10 may not have the configuration in which the filter processing is changed based on the signal input from the user U. The acoustic device 10 may include an operation section (for example, a physical button) that receives the operation of the user U. In this case, the acoustic device 10 may not have a function of performing wireless communication. Further, the filter processing may be changed based on an utterance of the user U. For example, the acoustic device 10 may have a configuration in which the content (filter name) of the utterance of the user U and the setting of the filter are associated in advance, and the setting of the filter is changed or switched on and off according to the utterance of the user U. Further, the user U may utter "turn on the xx (filter name)" to turn on the filter having the filter name xx.

In the acoustic device 10, when the name of the speaker, the feature information of the speaker, and the setting of the filter related to the feature information (filter processing) are made to correspond to each other and registered, a configuration may be adopted in which the setting of the corresponding filter is changed according to the utterance of the name of the speaker by the user U.

Third Modification

The acoustic device of the present invention may not be an earphone type. For example, the acoustic device of the present invention may be configured to cover the ear 100 of the user U as in a headphone type. In this case, a portion corresponding to an ear cup is attached to the ear of the user, and corresponds to a member that divides the ear canal of the user and the external space.

Fourth Modification

The function realized by the signal processing section 14 of the embodiment described above may be realized by a combination of a plurality of programs, or by cooperation of a plurality of hardware resources. In a case where the function of the signal processing section 14 is realized by using a program, the program may be provided in a state of being stored in a computer-readable recording medium such as a magnetic recording medium (magnetic tape, magnetic disk (Hard Disk Drive (HDD)), Flexible Disk (FD)), an optical recording medium (such as an optical disk), a magneto-optical recording medium, or a semiconductor memory, and the program may also be distributed over a network.

Embodiments of the present disclosure are summarized as follows.

(1) There is provided an acoustic device including a member which divides an ear canal of a user and an external space when being attached to an ear or the ear canal of the user; an acquisition section which acquires a sound signal indicating a sound; a sound processing section which applies a filter processing to the sound signal acquired by the acquisition section, the sound processing section changing the filter processing in accordance with a predetermined condition; and a sound emitting section which radiates the sound indicated by the sound signal applied with the filter processing to the ear canal.

(2) The acoustic device according to (1) further includes a detection section which detects an external sound, and the acquisition section acquires a sound signal indicating the external sound detected by the detection section or a sound signal indicating a sound received via a communication section.

(3) The acoustic device according to (1) or (2) further includes a selection section which selects a sound to be passed or a sound not to be passed by the filter processing, and the sound processing section changes the filter processing in accordance with the sound selected by the selection section.

(4) In the acoustic device according to (3), the selection section determines, based on a signal input by the user when a specific sound is passed, whether to select the specific sound as the sound to be passed or the sound not to be passed.

(5) The acoustic device according to (3) or (4) further includes a communication section which performs communication to acquire a signal for selecting the sound to be passed or the sound not to be passed, and the selection section selects the sound to be passed or the sound not to be passed based on the signal acquired by the communication.

(6) In the acoustic device according to any one of (1) to (5), the sound processing section changes the filter processing in accordance with a geographical position of the acoustic device.

(7) In the acoustic device according to any one of (1) to (6), the sound processing section changes the filter processing in accordance with time.

(8) In the acoustic device according to any one of (1) to (7), the sound processing section changes the filter processing in accordance with the user.

(9) In the acoustic device according to any one of (1) to (8), the sound processing section changes the filter processing in accordance with an attribute of the user.

(10) In the acoustic device according to any one of (1) to (9), the sound emitting section radiates a sound indicated by the sound signal applied with the filter processing and an alternative sound different from the sound to the ear canal at a same timing.

(11) The acoustic device according to any one of (3) to (10) further includes a speaker recognition section which recognizes a speaker based on a feature of voice of the speaker, and the selection section selects the voice of the speaker recognized by the speaker recognition section as the sound not to be passed.

(12) The acoustic device according to any one of (1) to (11) further includes a biological signal detection section which detects a biological signal of the user, and the sound processing section changes the filter processing in accordance with a change in the biological signal.

(13) In the acoustic device according to any one of (2) to (12), the sound processing section changes the filter processing in accordance with an utterance of the user detected by the detection section.

(14) In the acoustic device according to any one of (1) to (13), the sound processing section changes the filter processing in accordance with a direction of the housing of the acoustic device and an arrival direction of a sound from the outside.

(15) There is provided an acoustic processing method including: an acquisition step of acquiring a sound signal indicating a sound; a filter processing step of applying filter processing to the sound signal acquired in the acquiring step; a sound processing step of changing the filter processing in the filter processing step in accordance with the predetermined condition; and a sound emitting step of radiating the sound indicated by the sound signal applied with the filter processing to an ear canal.

(16) The acoustic processing method according to (15) further includes a detection step of detecting an external sound, and the acquisition step acquires a sound signal indicating the external sound detected in the detection step or a sound signal indicating a sound received through communication.

(17) The acoustic processing method according to (15) or (16) further includes a selection step of selecting a sound to be passed or a sound not to be passed through the filter processing, and the sound processing step changes the filter processing in accordance with the sound selected in the selection step.

(18) In the acoustic processing method according to (17), the selection step determines, based on a signal input by the user when a specific sound is passed, whether to select the specific sound as the sound to be passed or the sound not to be passed.

(19) The acoustic processing method according to (17) or (18) further includes a communication step of performing communication to acquire a signal for selecting the sound to be passed or the sound not to be passed, and the selection step selects the sound to be passed or the sound not to be passed based on the signal acquired by the communication.

(20) In the acoustic processing method according to any one of (15) to (19), the sound processing step changes the filter processing in accordance with a geographical position of an acoustic device implementing the acoustic processing method.

(21) In the acoustic processing method according to any one of (15) to (20), the sound processing step changes the filter processing in accordance with time.

(22) In the acoustic processing method according to any one of (15) to (21), the sound processing step changes the filter processing in accordance with the user.

(23) In the acoustic processing method according to any one of (15) to (22), the sound processing step changes the filter processing in accordance with an attribute of the user.

(24) In the acoustic processing method according to any one of (15) to (23), the sound emitting step radiates a sound indicated by the sound signal applied with the filter processing and an alternative sound different from the sound to the ear canal at a same timing.

(25) The acoustic processing method according to any one of (17) to (24) further includes a speaker recognition step of recognizing a speaker based on a feature of voice of the speaker, and the selection step selects the voice of the speaker recognized in the speaker recognition step as the sound not to be passed.

(26) The acoustic processing method according to any one of (15) to (25) further includes a biological signal detection step of detecting a biological signal of the user, and the sound processing step changes the filter processing in accordance with a change in the biological signal.

(27) In the acoustic processing method according to any one of (16) to (26), the sound processing step changes the filter processing in accordance with an utterance of the user detected in the detection step.

(28) In the acoustic processing method according to any one of (15) to (27), the sound processing step changes the filter processing in accordance with a direction of the housing of the acoustic device implemented by the acoustic processing method and an arrival direction of a sound from the outside.

The present invention is useful because external sounds to be heard by the user can be changed.

What is claimed is:

1. An acoustic device comprising:
    a member which divides an ear canal of a user and an external space when being attached to an ear or the ear canal of the user;
    a selector that selects a sound to be passed or a sound not to be passed by the filter processing;
    a memory that stores instructions; and
    a processor that executes the instructions, wherein
        the instructions cause the processor to perform:
            acquiring a sound signal indicating a sound;
            applying a filter processing to the acquired sound signal, the filter processing being changed in accordance with a predetermined condition; and
            radiating the sound indicated by the sound signal applied with the filter processing to the ear canal;
            changing the filter processing in accordance with the selected sound; and
            determining, based on a signal input by the user when a specific sound is passed, whether to select the specific sound as the sound to be passed or the sound not to be passed.

2. The acoustic device according to claim 1, further comprising:
    a detector that detects an external sound, wherein the instructions cause the processor to perform:
    acquiring a sound signal indicating the external sound detected by the detector or a sound signal indicating a sound received via a communication device.

3. The acoustic device according to claim 1, further comprising:
    a communicator that acquires a signal for selecting the sound to be passed or the sound not to be passed, wherein the instructions cause the processor to perform:
    selecting the sound to be passed or the sound not to be passed based on the signal acquired by the communicator.

4. The acoustic device according to claim 1, wherein
    the selector selects the sound to be passed or the sound not to be passed in accordance with a geographical position of the acoustic device.

5. The acoustic device according to claim 1, wherein
    the selector selects the sound to be passed or the sound not to be passed in accordance with time.

6. The acoustic device according to claim 1, wherein
    the selector selects the sound to be passed or the sound not to be passed in accordance with an operation by the user.

7. The acoustic device according to claim 1, wherein
    the selector selects the sound to be passed or the sound not to be passed in accordance with an attribute of the user.

8. The acoustic device according to claim 1, wherein the instructions cause the processor to perform:
    radiating a sound indicated by the sound signal applied with the filter processing and an alternative sound different from the sound to the ear canal at a same timing.

9. The acoustic device according to claim 1, wherein the instructions cause the processor to perform:
    recognizing a speaker based on a feature of voice of the speaker,
    selecting the voice of the recognized speaker as the sound not to be passed.

10. The acoustic device according to claim 1, wherein the instructions cause the processor to perform detecting a biological signal of the user, wherein
    the selector selects the sound to be passed or the sound not to be passed in accordance with a change in the biological signal.

11. The acoustic device according to claim 2, wherein
    the selector selects the sound to be passed or the sound not to be passed in accordance with an utterance of the detected sound of the user.

12. The acoustic device according to claim 1, wherein
    the selector selects the sound to be passed or the sound not to be passed in accordance with a direction of a housing of the acoustic device and an arrival direction of a sound from an outside.

13. An acoustic processing method comprising:
    acquiring a sound signal indicating a sound;
    applying a filter processing to the sound signal acquired in the acquiring step;
    changing the filter processing in the filter processing step in accordance with a predetermined condition;
    radiating the sound indicated by the sound signal applied with the filter processing to an ear canal;
    selecting a sound to be passed or a sound not to be passed through the filter processing;
    changing the filter processing in accordance with the selected sound; and
    determining, based on a signal input by a user when a specific sound is passed, whether to select the specific sound to be passed or the sound not to be passed.

14. The acoustic processing method according to claim 13, further comprising:
   detecting an external sound; and
   acquiring a sound signal indicating the external sound or a sound signal indicating a sound received through communication.

15. The acoustic processing method according to claim 13, further comprising:
   performing communication to acquire a signal for the sound to be passed or the sound not to be passed; and
   selecting the sound to be passed or the sound not to be passed based on the signal acquired by the communication.

16. The acoustic processing method according to claim 13, further comprising:
   recognizing a speaker based on a feature of voice of the speaker; and
   selecting the voice of the speaker recognized in the recognizing as the sound not to be passed.

17. The acoustic processing method according to claim 13, further comprising:
   detecting a biological signal of the user; and
   selecting the sound to be passed or the sound not to be passed in accordance with a change in the biological signal.

* * * * *